(12) United States Patent
Keniston et al.

(10) Patent No.: US 8,896,890 B2
(45) Date of Patent: Nov. 25, 2014

(54) IMAGE CAPTURE SYSTEM HAVING A FOLDED OPTICAL PATH

(75) Inventors: Matthew Ryan Keniston, Lexington, KY (US); Robert White Milgate, III, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 429 days.

(21) Appl. No.: 13/174,634

(22) Filed: Jun. 30, 2011

(65) Prior Publication Data
US 2013/0003140 A1   Jan. 3, 2013

(51) Int. Cl.
*H04N 1/04*   (2006.01)
*H04N 1/028*  (2006.01)
*H04N 1/00*   (2006.01)
*H04N 1/195*  (2006.01)
*H04N 1/46*   (2006.01)

(52) U.S. Cl.
CPC ......... *H04N 1/00493* (2013.01); *H04N 1/0285* (2013.01); *H04N 1/02825* (2013.01); *H04N 1/0284* (2013.01); *H04N 1/19594* (2013.01); *H04N 1/0268* (2013.01); *H04N 1/00535* (2013.01)

USPC ............................ 358/474; 358/497; 358/505

(58) Field of Classification Search
None
See application file for complete search history.

(56) References Cited

U.S. PATENT DOCUMENTS 7,611,055 B1 *  11/2009  Detwiler ..................... 235/440
2012/0257371 A1 *  10/2012  Keniston et al. ............ 362/17

* cited by examiner

*Primary Examiner* — Thierry L Pham
(74) *Attorney, Agent, or Firm* — William F. Esser

(57) ABSTRACT

An image capture system including a platen for receiving a media sheet bearing an image to be captured; an illumination system for illuminating the media sheet; a mirror disposed in optical communication with the platen, for reflecting light from the illumination system reflected from the media sheet; and an optical sensor for receiving the light reflected by the mirror. The interrelationship between the platen, mirror and optical sensor is such that a location of a top edge of the mirror's primary reflection projected onto the platen is lower than a location of a bottom edge of the image's secondary reflection projected onto the platen. In this way, the image captured by the optical sensor is free of secondary reflections.

23 Claims, 10 Drawing Sheets

IMAGE CAPTURE SYSTEM HAVING A FOLDED OPTICAL PATH

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present invention relates generally to an optical image capture system, and more particularly to such a system having a folded optical path with reduced or eliminated secondary reflections.

2. Description of the Related Art

Image capture systems are used in a variety of applications. Such systems may be combined in an all-in-one unit that includes image capture, image formation, and facsimile functions. Image capture systems may also be independent and only capable of performing an image capture function. Digital photograph technology has progressed with imaging units now able to produce high quality two dimensional images in a single step process. The imaging units are also economical allowing them to be utilized in new applications, such as document scanning technology.

Image capture systems having a folded optical path with a mirror have been recognized for advantageously compressing the volume of the system. Folding the optical path is seen to induce secondary reflections, e.g., a lower intensity optical ghost image of the document superimposed over a portion of the image/document captured by the sensor of the capture system. A secondary reflection is inherent in a folded optical system where the document is separated from the optical components (camera sensor, lenses, mirror, illumination, etc.) by a reflective component, such as a sheet of glass. Specifically, secondary reflections occur when there exists an optical path in the image capture system for light to leave some portion of the document, bounce first off the mirror, then back off the reflective surface at the document (scan glass), and finally off the mirror again before entering the camera sensor.

A number of attempts have been made to address the capture of secondary reflections. First, the scan glass, i.e., the platen against which the document to be scanned is disposed, was implemented as anti-reflective glass. The anti-reflective coating on the scan platen was formulated to return 1% or less of the RGB wavelengths used to illuminate the document. However, this approach proved to be insufficient to completely eliminate secondary reflections. Further, once gamma correction was applied to the resulting image, the undesirable reflection was further enhanced.

Next, image processing algorithms were investigated to remove the secondary reflection. However, algorithms were unable to distinguish between primary and secondary reflections in the captured image of the document being scanned. For example, if a white area reflected over a black region, the reflection would appear gray. No method was successfully devised that would distinguish between the resulting grey region and an equivalent gray nearby in the document. In addition, if the reflection pushed a region into saturation, it is impossible to determine the true intensity of the region once the reflection was removed.

Accordingly, it will be appreciated that an image capture system having a folded optical path that substantially reduces or eliminates the occurrence of secondary reflections is desired.

SUMMARY

An image capture system according to one example embodiment includes a platen for receiving a media sheet bearing an image to be captured; an illumination system for illuminating the media sheet; a mirror disposed in optical communication with the platen, for reflecting light generated by the illumination system that is reflected by the media sheet; and an optical sensor for receiving the light reflected by the mirror. A location of a top edge of the mirror's primary reflection projected onto the platen is lower on the platen than a location of a bottom edge of the image's secondary reflection projected onto the platen. By ensuring that the location of the top edge of the mirror's primary reflection is positioned on the platen to be lower than the bottom edge of the image's secondary reflection on the platen, no secondary reflection will be present in the captured image.

BRIEF DESCRIPTION OF THE DRAWINGS

The above-mentioned and other features and advantages of the various embodiments, and the manner of attaining them, will become more apparent and will be better understood by reference to the accompanying drawings.

DETAILED DESCRIPTION

Figure 1:
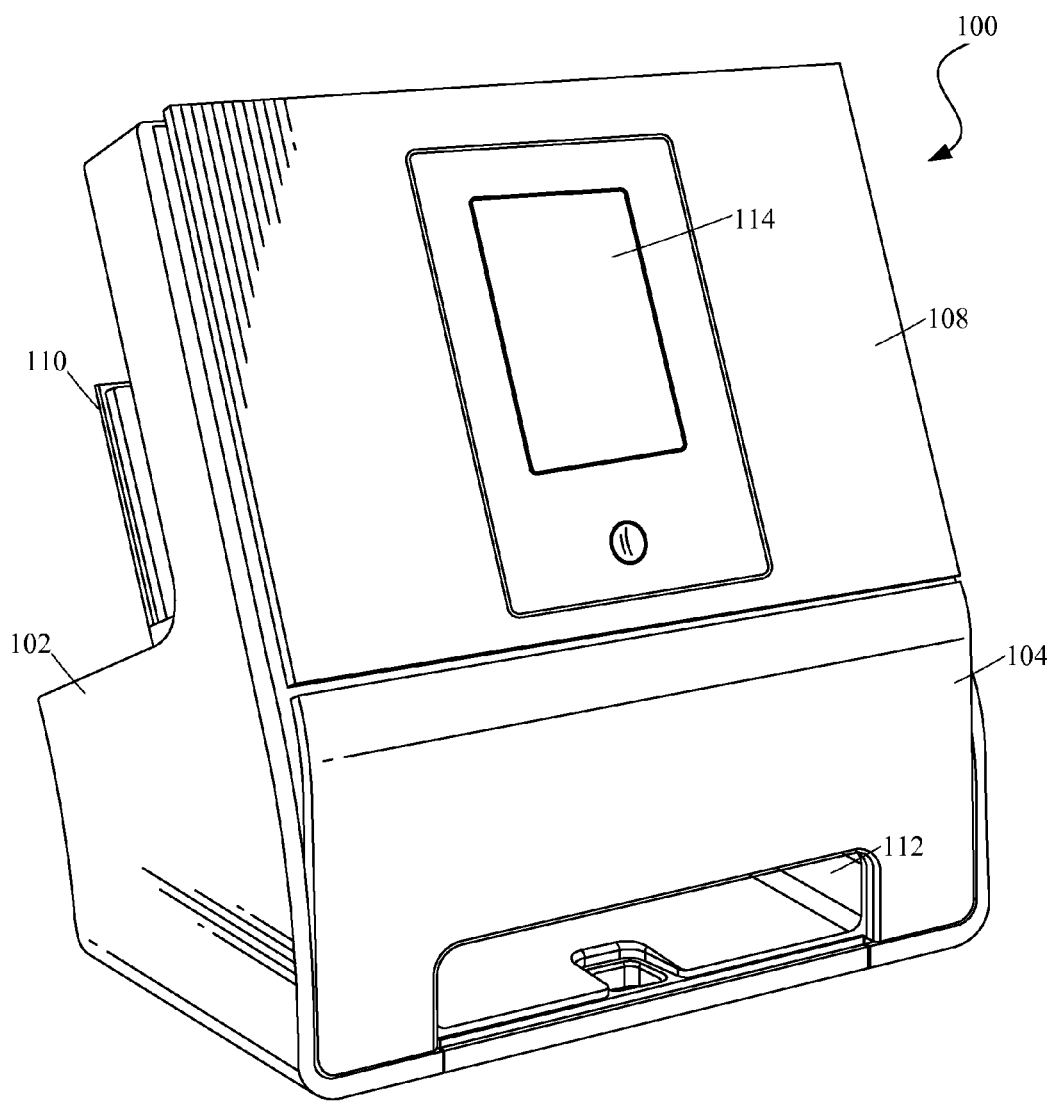
FIGS. 1 and 2 are perspective views of an imaging device according to one example embodiment.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2:
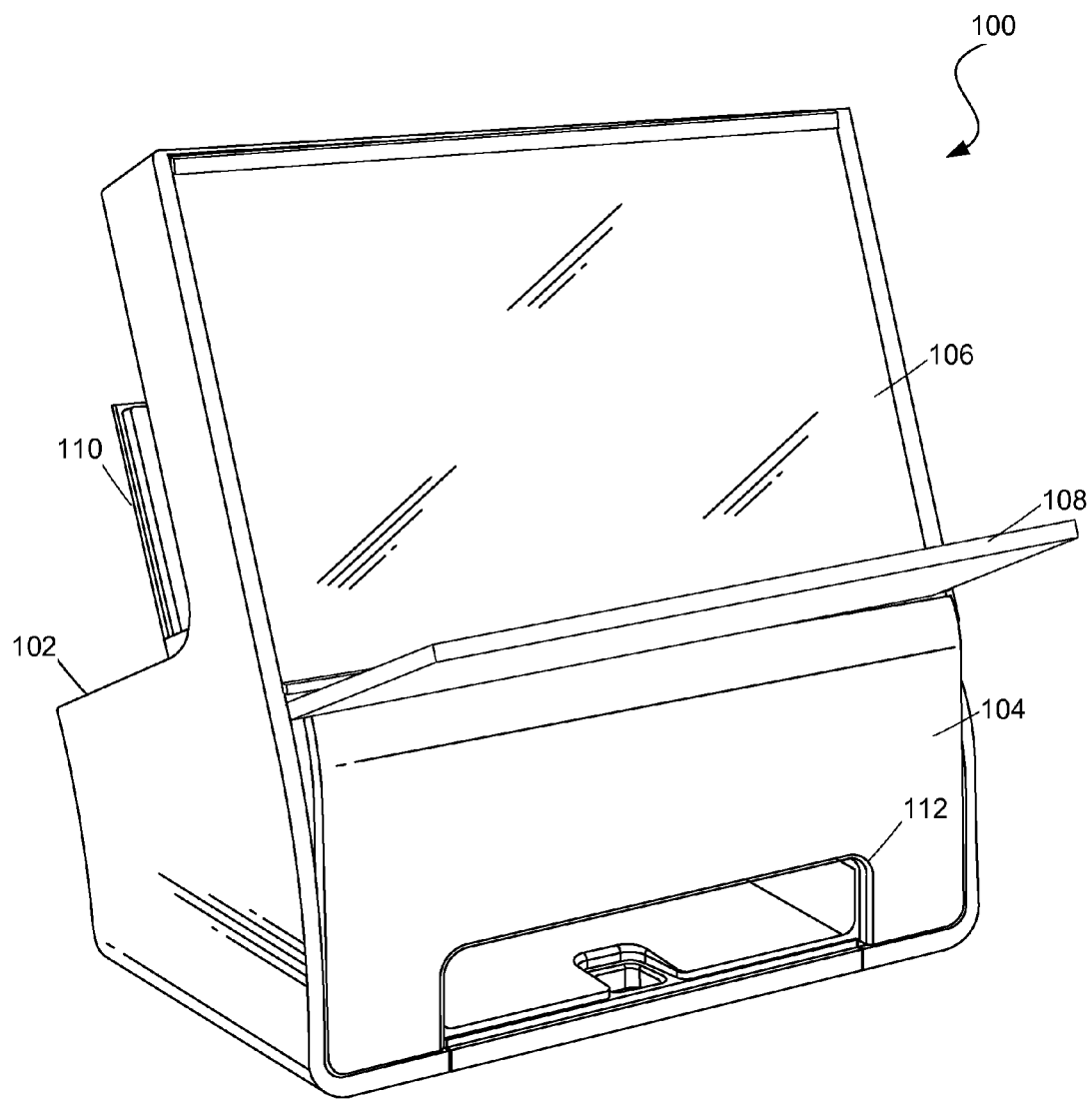

FIGS. 1 and 2 illustrate perspective views of an imaging device 100 according to one example embodiment. Imaging device 100, which may be a standalone imaging device, includes a housing 102 having a front portion 104 including an imaging window 106 (FIG. 2). Imaging window 106 may be constructed from a rigid, transparent and/or translucent material, such as glass.

Imaging device 100 also includes a lid 108 pivotally connected to the front portion 104 of housing 102. Lid 108 may be pivotally connected along a bottom edge thereof to housing 102 via hinges or the like (not shown) to allow lid 108 to move between a closed position as shown in FIG. 1 and an open position as shown in FIG. 2. The back portion of imaging device 100 may have an input media tray 110 that retains one or more print media sheets therein. A media output area 112 may be positioned along a lower part of front portion 104.

Figure 3:
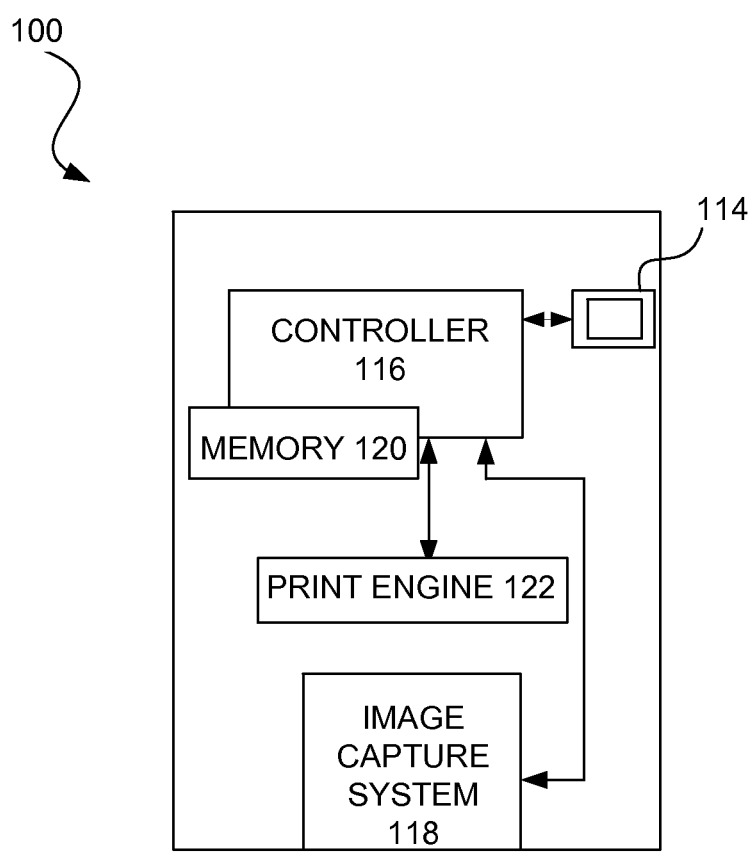
FIG. 3 is a block diagram of at least some of the components of the imaging device illustrated in FIGS. 1 and 2.

FIG. 3 is a block diagram depicting at least some of the main components of imaging device 100. Imaging device 100 includes an image capture system 118 disposed within housing 102 which captures an image from one or more documents disposed against imaging window 106. Image capture system 118 may be coupled to and controlled by a controller 116 of imaging device 100. Imaging device 100 may also optionally include a print engine 122, controlled by controller 116, for forming an image onto a sheet of media. Print engine 122 may include any of a variety of different types of printing mechanisms including dye-sublimation, dot-matrix, ink jet or laser printing. Imaging device 100 may include one or more mechanisms (not shown) for picking a sheet of media from input media tray 110, moving the picked sheet to be adjacent to print engine 122 for printing an image thereon, and moving the picked sheet having the printed image to output area 112.

Imaging device 100 may include a user interface, such as a graphical user interface, for receiving user input concerning image formation or image capture operations performed or to be performed by imaging device 100, and for providing to the user information concerning same. The user interface may include firmware maintained in memory 120 within housing 102 which is performed by controller 116 or other processing element. In the example embodiment illustrated, the graphical user interface includes a display panel 114, which may be a touch screen display in which user input is provided by the user touching or otherwise making contact with panel 114. As shown in FIG. 1, display panel 114 may be disposed along the outer surface of lid 108 and sized for providing graphic images that allow for convenient communication of information between imaging device 100 and the user. Display panel 114 may include a liquid crystal display, a light emitting diode display or the like.

Figure 4:
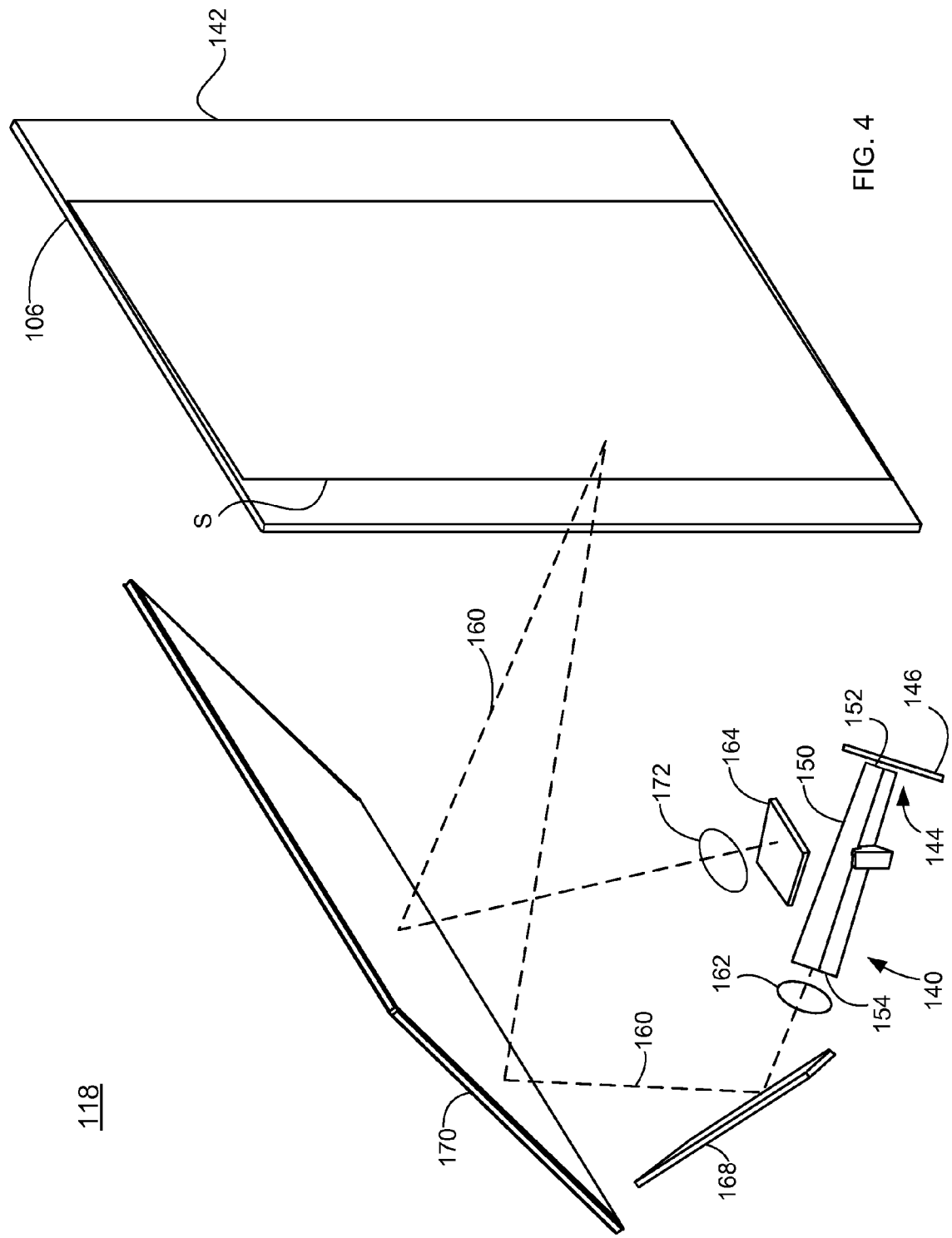
FIG. 4 is a perspective view of an image capture system of the imaging device of FIGS. 1 and 2 according to an example embodiment.

FIG. 4 is a perspective view of image capture system 118 according to one example embodiment. Image capture system 118 may include an illumination device 140 positioned within housing 102 behind imaging window 106, which defines a document plane 142. Illumination device 140 includes a light source 144. Light source 144 may include a single light emitting diode or an array of light emitting diodes (LEDs), such as a three channel array of red, green and blue LEDs, operatively mounted on a printed circuit board assembly 146. Controller 116 of imaging device 100 is coupled to and controls the operation of light source 144 through printed circuit board assembly 146. Alternatives include those wherein a conventional light source, such as various light bulbs, is used.

Illumination device 140 may also include an integrating light pipe 150. Light pipe 150 includes an input face 152 that is positioned to receive light from light source 144 and an output face 154 that transmits light from light source 144 along an optical path to document plane 142. As is known in the art, a light pipe is an optic design having the property of converting a point or small area light source, such as an LED, into a larger, uniformly illuminated, two dimensional surface. Light pipe 150 corrects illumination non-uniformities caused by the differences in the relative positions of the light sources, which in the example embodiment shown are multiple LED die, by way of total internal reflection. Each die is referred to as an individual channel of the multi-channel light source 144 and may vary in position with respect to input face 152. As desired, output face 154 of light pipe 150 may also provide collimation of the light rays from light source 144.

With continued reference to FIG. 4, illumination device 140 may further include a projection element 162 that is positioned to focus the light from output face 154 of light pipe 150 onto document plane 142 so that document plane can be imaged by an image sensor 164. In the example embodiment illustrated, projection element 162 is a combination of a condenser and objective lens. In one embodiment, the condenser is a biconvex aspherical lens. However, projection element 162 may be any suitable device, or combination of devices, for focusing light from output face 154 of light pipe 150 to document plane 142 such as a curved mirror or a multi-element system.

Image capture system 118 may further include a pair of mirrors 168, 170 in optical path 160. Mirrors 168, 170 are used to reduce the footprint of image capture system 118 to permit a reduction in the size of the portion of body 102 used to contain image capture system 118. Although two mirrors are illustrated, any number of mirrors may be employed as desired. In the example embodiment illustrated, light first passes from light source 144 through light pipe 150. The light is then projected along optical path 160 by projection element 162 to first mirror 168 which directs the light to second mirror 170. Second mirror 170 then directs the light to document plane 142 defined by imaging window 106. Imaging window 106 is illustrated with a media sheet S positioned on an outer surface thereof for image capture. The light beam is reflected from document plane 142 back to second mirror 170 which reflects the light beam through a lens assembly 172 to image sensor 164 which captures an image of sheet S. Suitable image sensors 164 include CCD and CMOS type sensors.

It has been observed that substantially optimum image capture is achieved when the central ray of the imaging optics package is, after all reflections and refractions, substantially perpendicular to the center of document plane 142 as shown in FIG. 4. As a result, in this embodiment, the light received by document plane 142 from light source 144 must have a primary optical axis that is at an oblique angle of incidence relative to document plane 142. In this configuration, as discussed above, output face 154 of light pipe 150 has an isosceles trapezoidal cross section to correct for the keystone effect that occurs as a result of the oblique approach.

Illumination device 140 may be used to illuminate the entirety of document plane 142. Alternatively, multiple illumination devices 140 may be used in combination to illuminate document plane 142 by positioning each illumination device 140 to illuminate a portion of document plane 142. Each illumination device 140 may illuminate a discrete section of document plane 142 or the various illuminated portions may overlap. Controller 116 or another processing element may then be used to piece together the individual portions and discard any overlapping areas to form the completed image.

As mentioned above, a folded optical path oftentimes induce a secondary reflection, which is lower intensity, optical ghost image of the image being captured that is superimposed over a portion of the captured image. Secondary reflections are seen in folded systems in which the document bearing the image to be scanned is separated from the optical components (image sensor 164, lens assembly 172, mirror 170, illumination device 140, etc.) by a reflective platen 142, or even in systems that are without a reflective platen if the surface of the document or article being captured has significant specular reflectivity. The arrangement of the optical components, in accordance with an example embodiment, serves to eliminate secondary reflections from the captured image.

Figure 5:
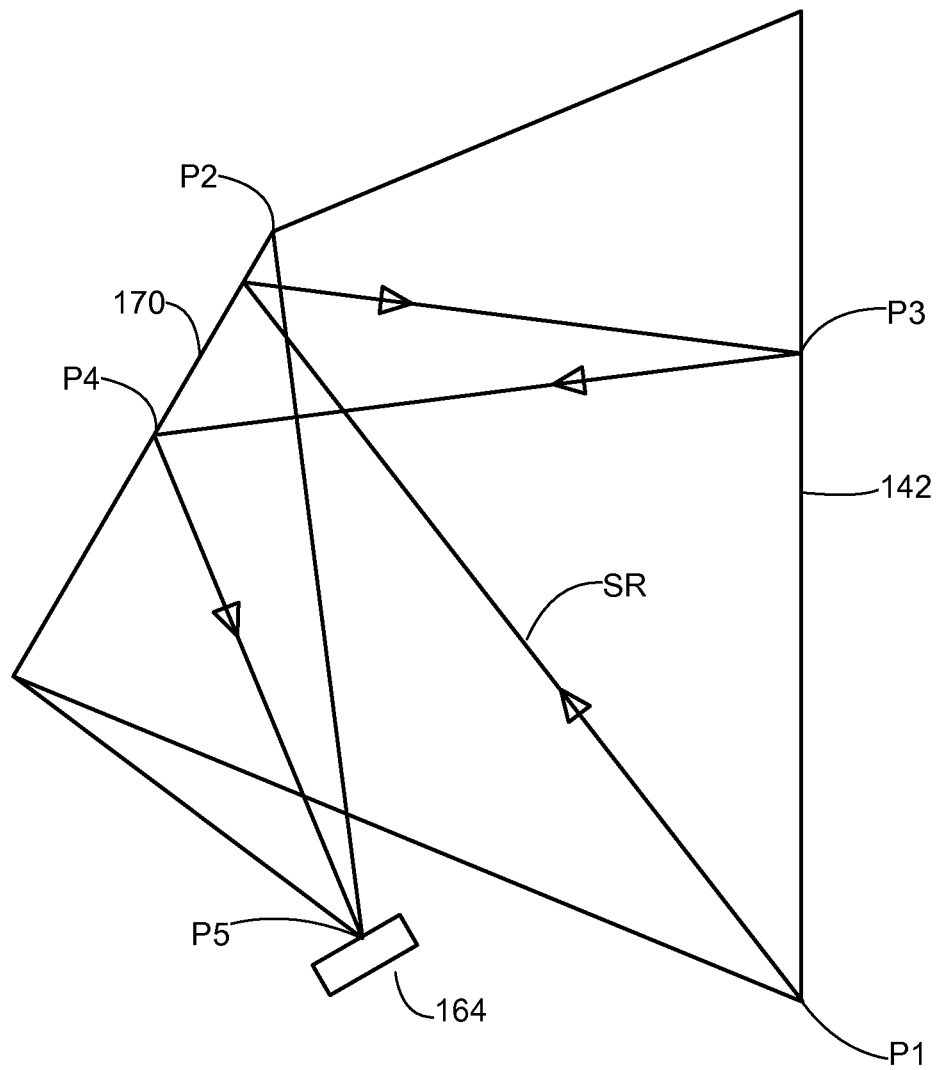
FIGS. 5-11 are side elevational views of the optical path of image capture system of FIG. 4 according to one or more example embodiments.

FIG. 5 illustrates a cross-sectional view of image capture system 118 which illustrates one such secondary reflection SR. Secondary reflection SR may, for example, originate from light reflecting off of a bottom surface of document S at point P1, then reflect off of mirror 170 at point P2, reflect off of the reflective surface of platen 142 at point P3, and reflect back off of mirror 170 at point P4 before being captured by image sensor 164 at P5. It has been determined that there is a specific "window" or arrangement of optical components in image capture system 118 having a folded optical path in which secondary reflections are not captured by image sensor 164. In general terms, such window in a folded optical path is seen to be based upon the distance and angle formed between the mirror 170 and platen 142.

Figure 6:
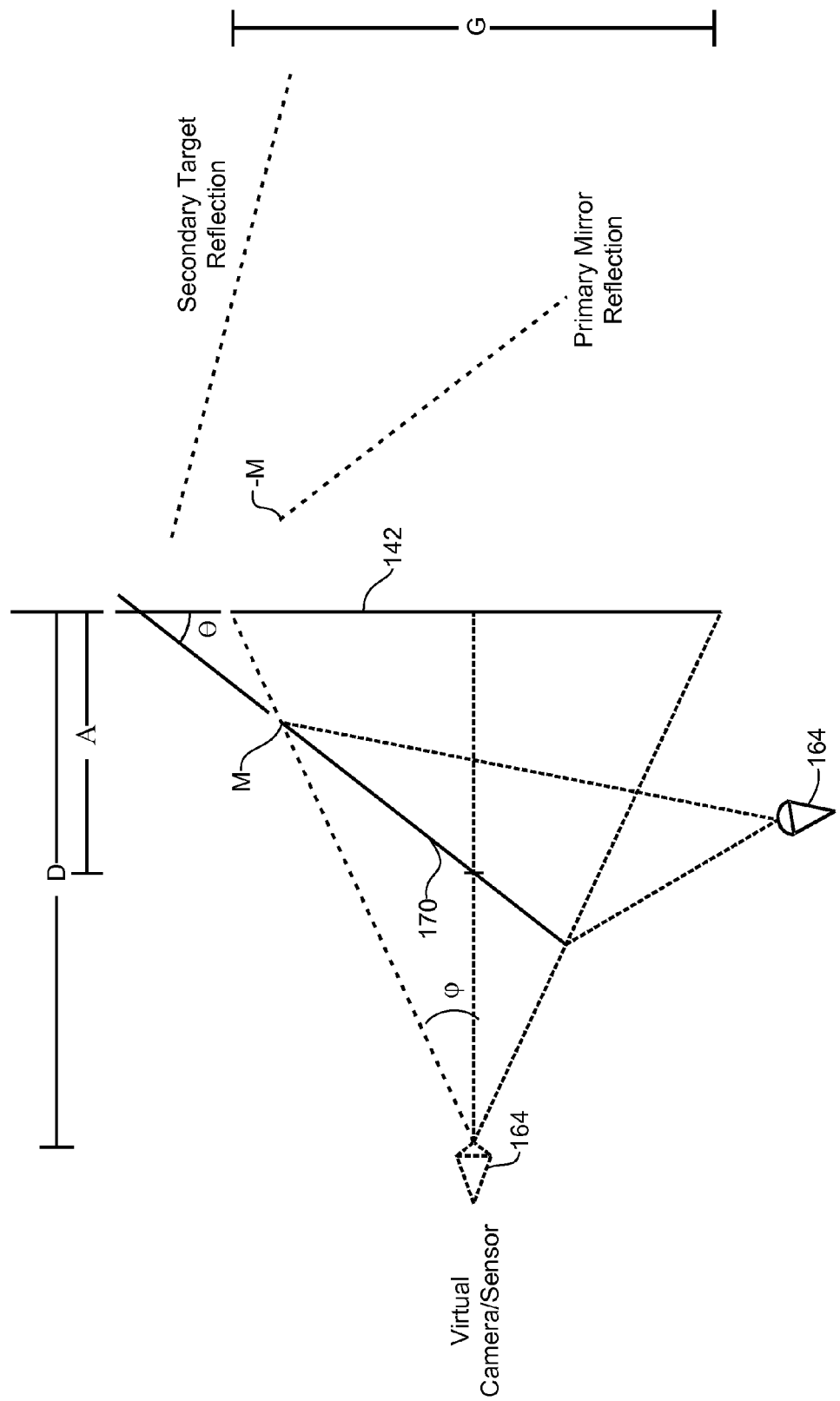

In particular, with reference to FIG. 6, the above-described "window" in which secondary reflections are not captured by image sensor 164 is based upon a distance "A" between mirror 170 and platen 142. The window is seen to also be based upon the angle θ between the planes which contain mirror 170 and platen 142. Though the window may be determined for any of a number of different distances A and angles θ, the window is determined below to correspond to a relatively small volume for optical path 160, such as a substantially minimal volume, so as to provide greater savings in the overall size of system 100.

When dealing with secondary reflections, the plane in which the central ray of the optical package is folded is of primary concern. This is the plane illustrated in FIG. 5. It is a plane perpendicular to the plane of the platen or document (in the case of a system without a platen) 142, the plane of the mirror 170, and the plane of the image sensor 164, containing the central ray of the imaging optics package. If the optical path for the secondary reflection is broken in this plane, no secondary reflection can appear in the captured image.

FIG. 6 illustrates the optical path 160. As stated above, the angle θ represents the angle between platen 142 and mirror 170, and A represents the distance between the reflective surface of platen 142 and mirror 170 along the central ray of the imaging optics package. Distance D is the distance between platen 142 and the focal point of the module including lens assembly 172 and image sensor 164. The letter G refers to the width of the target area along platen 142 and/or the area of interest of the document, and φ is the half angle of the field of view (FOV) of image sensor 164, such that $\varphi = \tan^{-1}(G/2D)$.

As can be seen in FIG. 6, and assuming an origin of a coordinate system being at the intersection of the inner surface of platen 142 and the central ray of image sensor 164, the top extreme of the field of view (FOV) can be defined as a line segment as follows:

$$Y_{Top} \text{slope} \equiv \tan\varphi = \tan\left(\tan^{-1}\frac{G}{2D}\right) = \frac{G}{2D}$$

and $$Y_{Top} \text{intercept} \equiv \frac{G}{2}$$

Therefore, the equation for the line segment for the top FOV may be expressed as:

$$Y_{Top} = \frac{G}{2D}x + \frac{G}{2} = \frac{G}{2}\left(\frac{x}{D} + 1\right)$$

The plane having mirror 170 can be defined as a line in FIG. 6 as:

$$Y_{Mirror} \text{slope} = \cot\theta,$$

and $$Y_{Mirror} \text{intercept} \equiv A\cot\theta.$$

This leads to the equation for the plane having mirror 170 being expressed as:

$$Y_{Mirror} = x\cot\theta + A\cot\theta = \cot\theta(x+A)$$

The bottom extreme of the FOV can be defined as a line as follows:

$$Y_{Bottom} = -Y_{Top} = -\frac{G}{2}\left(\frac{x}{D} + 1\right)$$

The top edge of the mirror is located at point M $[M_x, M_y]$ in FIG. 6, such that $M_x$ is defined where:

$$Y_{Mirror} = Y_{top}$$

Therefore:

$$\cot\theta * (x+A) = \frac{G}{2}\left(\frac{x}{D} + 1\right)$$

This results in $M_x$ represented as:

$$M_x = \frac{\frac{G}{2} - A\cot\theta}{\cot\theta - \frac{G}{2D}}$$

and leads to the value for $M_y$ as:

$$M_y = \cot\theta\left(\frac{\frac{G}{2} - A\cot\theta}{\cot\theta - \frac{G}{2D}} + A\right)$$

Thus M[$M_x$, $M_y$] is:

$$M = \left[ \frac{\frac{G}{2} - A\cot\theta}{\cot\theta - \frac{G}{2D}}, \cot\theta \left( \frac{\frac{G}{2} - A\cot\theta}{\cot\theta - \frac{G}{2D}} + A \right) \right]$$

The top edge of the primary reflection of mirror 170 is located at point −M which therefore may be represented as:

$$-M = \left[ -\left( \frac{\frac{G}{2} - A\cot\theta}{\cot\theta - \frac{G}{2D}} \right), \cot\theta \left( \frac{\frac{G}{2} - A\cot\theta}{\cot\theta - \frac{G}{2D}} + A \right) \right]$$

Figure 7:
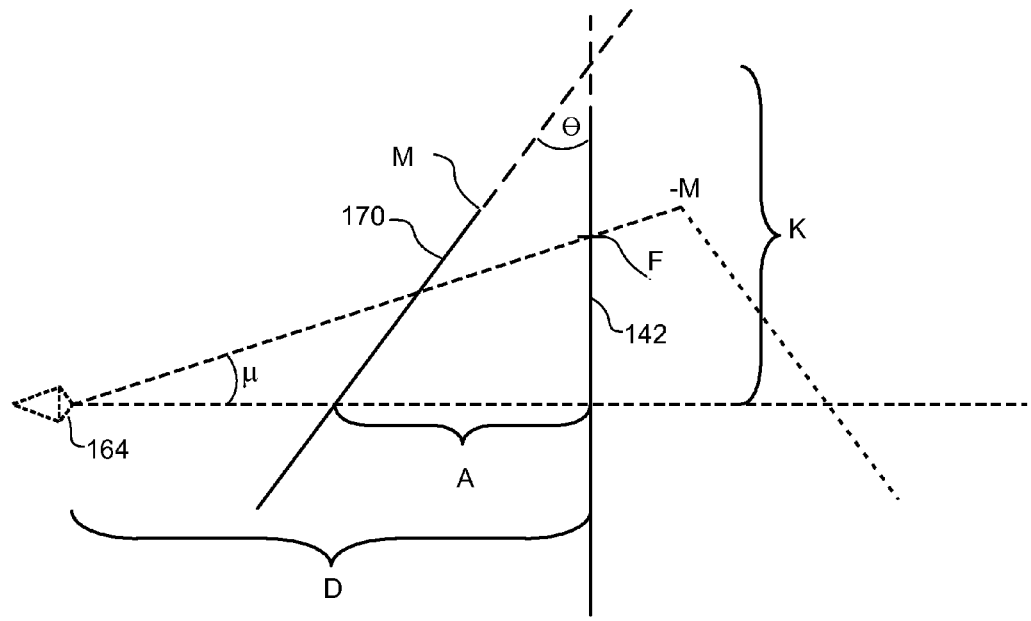

Referring to FIG. 7, the top edge of the primary reflection of mirror 170 projected onto platen 142 is located at point F. The relationship between F and distance D may be represented as:

$$\tan\mu = \frac{F}{D}$$

where μ may be defined by:

$$\mu = \tan^{-1}\left( \frac{|M_y|}{|-M_x| + D} \right)$$

For point F [$F_x$, $F_y$], $F_x$=0 because it lies on the y-axis which in this case is the reflective surface of platen 142. The value of $F_y$ may be defined as:

$$F = D\tan\mu = D\tan\left[ \tan^{-1}\left( \frac{|M_y|}{|-M_x| + D} \right) \right]$$

which leads to the equation for $F_y$ to be:

$$F = \frac{D|M_y|}{|-M_x| + D} = \frac{D\left| \cot\theta \left( \frac{\frac{G}{2} - A\cot\theta}{\cot\theta - \frac{G}{2D}} + A \right) \right|}{\left| -\left( \frac{\frac{G}{2} - A\cot\theta}{\cot\theta - \frac{G}{2D}} \right) \right| + D}$$

Figure 8:
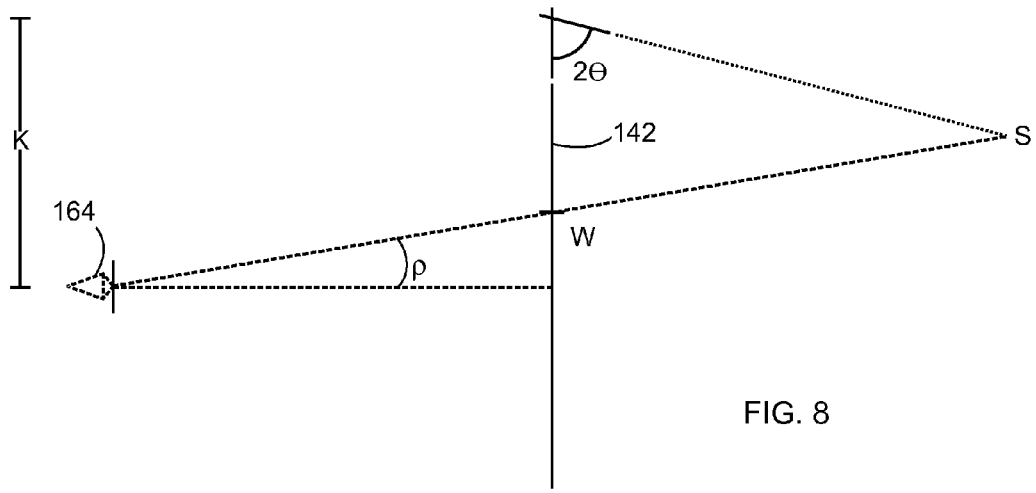

With reference now to FIG. 8, if K is defined as the distance from the midpoint of platen 142 to the virtual intersection of mirror 170 and platen 142, then K may be expressed as:

$$K = \frac{A}{\tan\theta}$$

The bottom edge of the secondary reflection of the document against platen 142 is located at point S in FIG. 8. The x-axis and y-axis components of point S=[$S_x$, $S_y$] may be represented as:

$$S_x = \left( K + \frac{G}{2} \right)\sin2\theta = \left( \frac{A}{\tan\theta} + \frac{G}{2} \right)\sin2\theta \text{ and}$$

$$S_y = K - \left( K + \frac{G}{2} \right)\cos2\theta = \frac{A}{\tan\theta} - \left( \frac{A}{\tan\theta} + \frac{G}{2} \right)\cos2\theta$$

The projection of point S onto platen 142 gives point W (FIG. 8). The line segment between the virtual location of image sensor 164 to point S may be defined by angle ρ taken from the normal of image sensor 164 and/or the document on platen 142. From this, one can see:

$$\rho = \tan^{-1}\frac{|S_y|}{|S_x| + D}$$

The x-axis coordinate $W_x$ of projection point W is equal to zero because it lies on the y-axis (i.e., platen 142). The y-axis coordinate Wy may be seen as:

$$W_y = \frac{D|S|}{|S_x| + D} = \frac{D\left| \frac{A}{\tan\theta} - \left( \frac{A}{\tan\theta} + \frac{G}{2} \right)\cos2\theta \right|}{\left| \left( \frac{A}{\tan\theta} + \frac{G}{2} \right)\sin2\theta \right| + D} \text{ or}$$

$$W_y = \frac{D\left| A\cot\theta - \left( A\cot\theta + \frac{G}{2} \right)\cos2\theta \right|}{\left| \left( A\cot\theta + \frac{G}{2} \right)\sin2\theta \right| + D}$$

The height $H_r$ of the secondary reflection on platen 142 may be represented as:

$$H_r = |F_y| - |W_y|$$

As can be seen, the secondary reflection will not appear in the captured image if the bottom edge Wy of the secondary reflection along platen 142 has a magnitude and/or absolute value which is greater than the corresponding magnitude/absolute value of the top edge of the primary reflection $F_y$ of mirror 170 along platen 142. In other words, no secondary reflection will be captured if height $H_r$ (as defined above) is less than zero. According to the example embodiments, therefore, the optical components of optical path 160 of image capture system 118 (platen 142, mirror 170 and image sensor 164/lens assembly 172) are oriented and situated so as to ensure that height $H_r$ of the secondary reflection on platen 142 yields a negative value.

Figure 9:
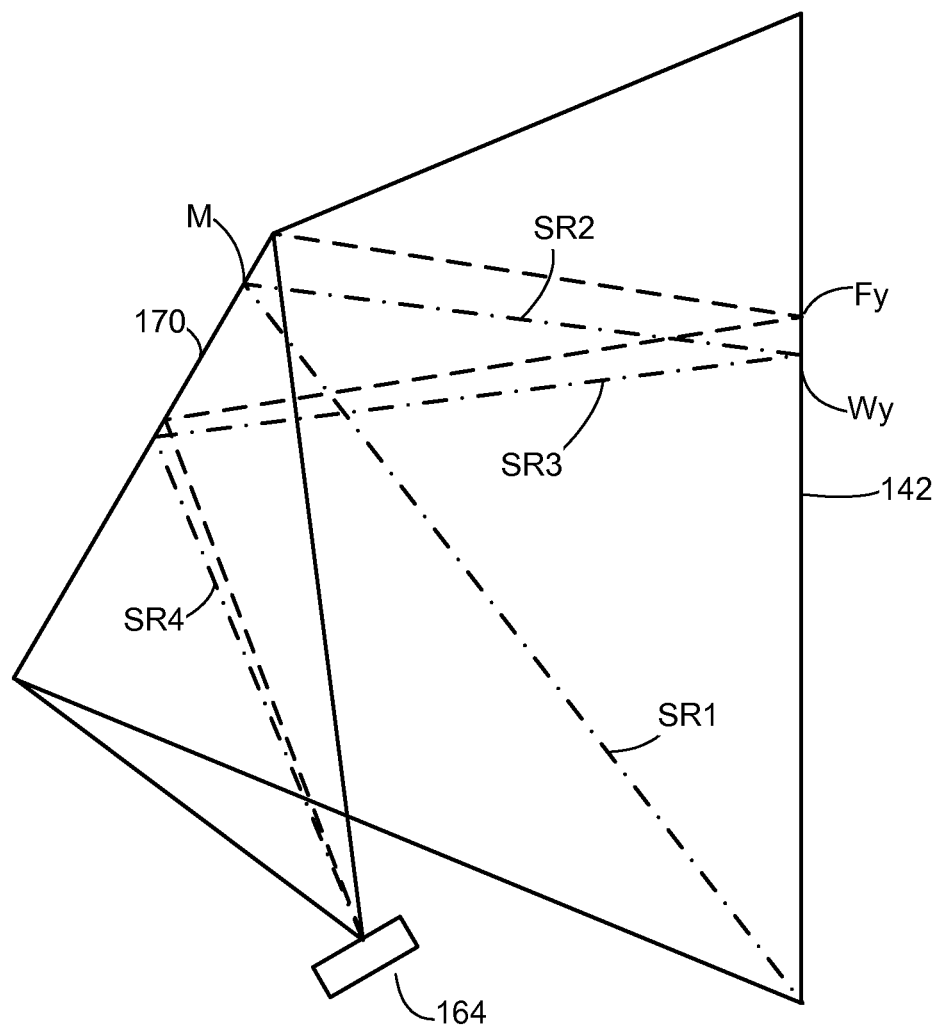

This situation may be illustrated in FIG. 9 in which the top of mirror 170 at point M is projected onto document platen 142 at $F_y$, reflected from platen 142 onto mirror 170 and then directed onto image sensor 164. Secondary reflection SR originates as a light beam segment SRI which is reflected from the bottom of the document on platen 142 and is then reflected by mirror 170 as light beam segment SR2 towards platen 142. Light beam segment SR2 is reflected from platen 142 at point $W_y$, back towards mirror 170 as light beam segment SR3, and is reflected from mirror 170 as light beam segment SR4 and directed towards image sensor 164. Designing image capture system 118 according to the above embodiments so that the spacing and orientation of the optical components thereof are such that the bottom edge of secondary reflection SR is reflected off platen 142 at point $W_y$ at a position above $F_3$, (i.e., so as to have a larger magnitude or absolute value) thereby guarantees that secondary reflection SR is not captured by image sensor 164. Viewed another way, designing optical path 160 according to the above embodiments so that point W$_y$ is above point F$_y$ requires that light beam segment SRI pass above and thus miss the top (point M) of mirror 170 such that mirror 170 is unable to reflect light beam segment SRI towards platen 142. Without any such reflection off mirror 170, secondary reflection SR cannot continue to propagate in optical path 160 and terminate at image sensor 164.

Figure 10:
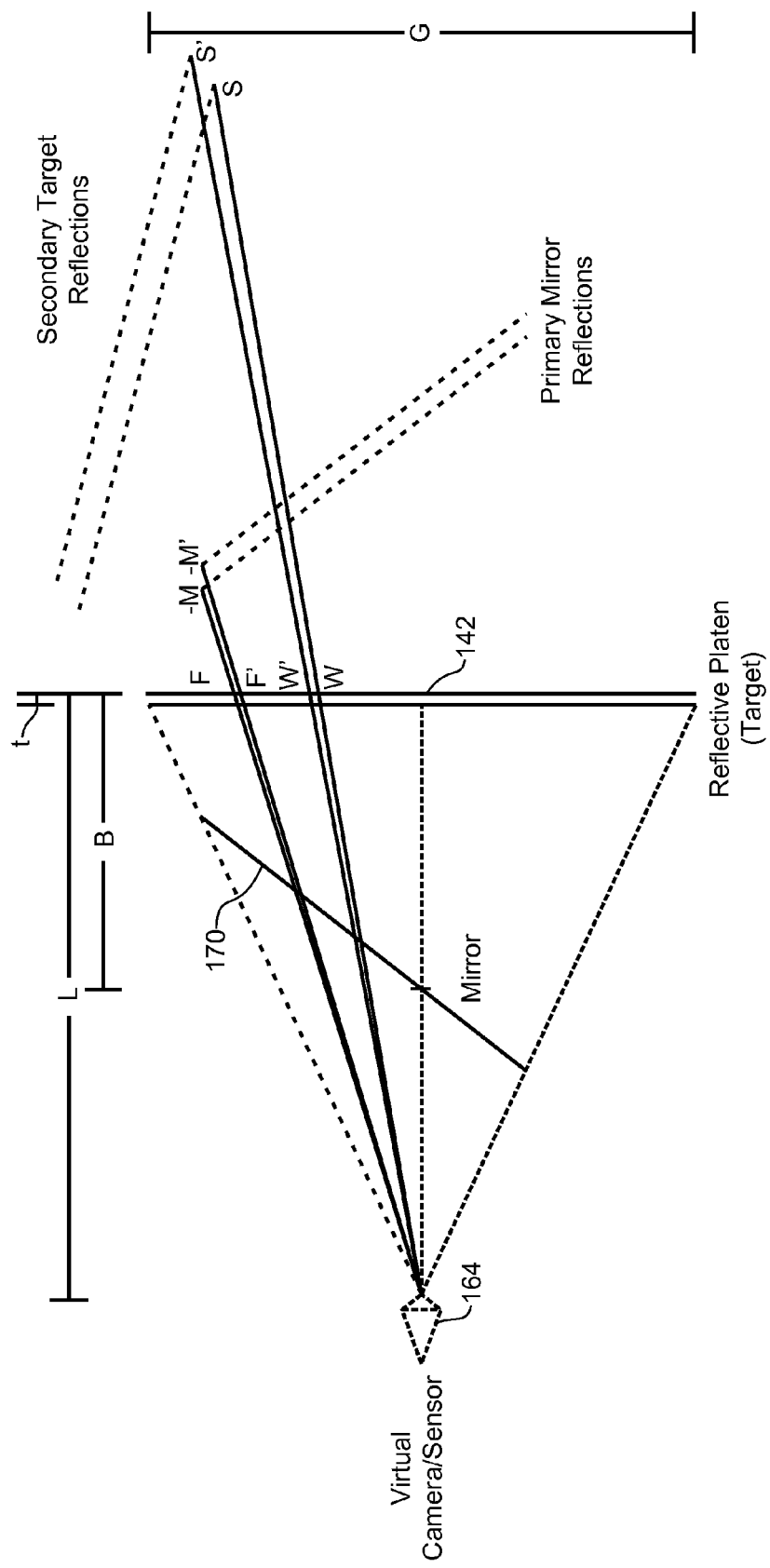

It is noted that the equations derived above relate to the inner surface of platen 142, i.e., the surface of platen 142 that is closest to mirror 170. With any platen having an appreciable thickness, secondary reflections may also be created from the outer surface of platen 142. Secondary reflections may be created by the outer surface of platen 142 in substantially the same way in which secondary reflections may be created by the inner surface of platen 142. FIG. 10 shows the locations of the top edge of the primary reflection F$_y$' of mirror 170 and the bottom edge W$_y$' of the secondary reflection associated with the outer surface of platen 142. As can be seen, the top edge of primary reflection F$_y$' and the bottom edge W$_y$' of the secondary reflection are closer together than primary reflection top edge F$_y$ and secondary reflection bottom edge W$_y$, from which one may conclude the outer surface of platen 142 creates a smaller and therefore less impactful secondary reflection relative to the inner surface thereof. Thus by eliminating the secondary reflections relative to the inner surface of platen 142, the secondary reflections relative to the outer surface thereof are also eliminated.

Given the above interrelationships between the components forming optical path 160 (i.e., mirror 170, platen 142 and image sensor 164), it is understood that optical path 160 may be made more robust by including a safety factor for the avoidance of secondary reflections SR. For example, optical path 160 may be designed with a safety factor by setting secondary reflection height H$_r$, according to the equation above, to be less than −10 mm and/or setting the bottom edge of the projected secondary reflection W$_y$ to be located at least 10 mm above the top edge of the projected primary reflection F$_y$. It is understood that a safety factor other than 10 mm may be used.

The above equations and determinations are based upon use of a pinhole type lens and image sensor assembly. A more precise approach, however, takes into account the use of lenses having a defined aperture for the acceptance of light. A more defined lens aperture may in some designs allow for some vignetted portion of the secondary reflection to enter the lens even when the use of the equation above for secondary reflection height H$_r$ predicts that, with no safety factor, no secondary reflection will be captured. An estimate for a safety factor to account for a particular lens diameter size can be determined.

Figure 11:
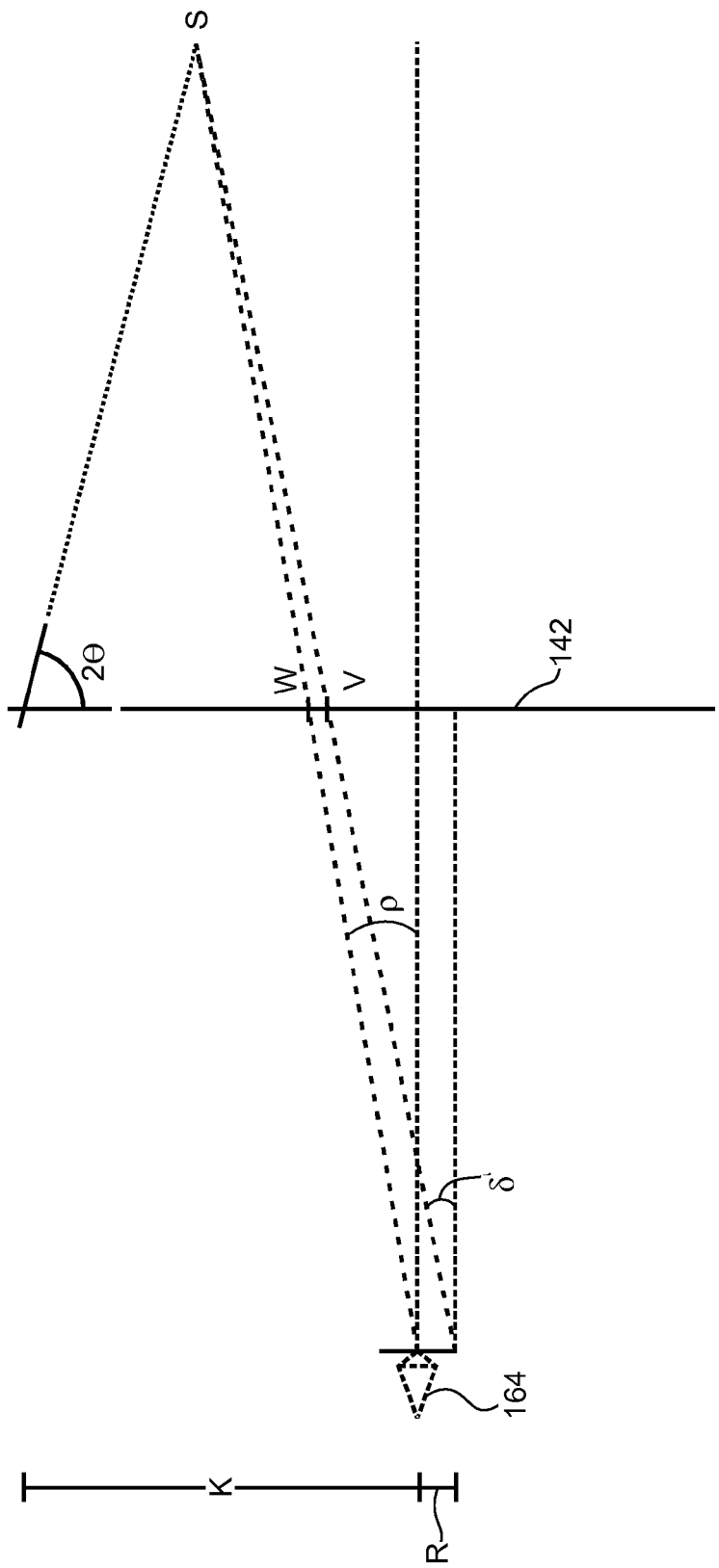

With reference to FIG. 11, radius R refers to the radius of the aperture of the lens/sensory assembly, and it is understood may also refer to the half-width in the fold plane of a rectangular aperture. The angle δ refers to the largest incident angle possible for a light ray from the bottom of the document's secondary reflection to enter the aperture of the lens/sensor assembly, and point V is the projection of the bottom edge of the document's secondary reflection along the light ray path defined in part by angle δ. From this, one can define angle δ by the equation:

$$\delta = \tan^{-1}\frac{|S_y| + R}{|S_x| + D}$$

Given that the x-axis component of point V is zero, the y-component V$_y$ may be represented as:

$$V_y = D\tan\delta - R = D\tan\left(\tan^{-1}\frac{|S_y| + R}{|S_x| + D}\right) - R$$

from which one can describe V$_y$ as:

$$V_y = \frac{D\left|A\cot\theta - \left(A\cot\theta + \frac{G}{2}\right)\cos 2\theta\right| + RD}{\left|\left(A\cot\theta + \frac{G}{2}\right)\sin 2\theta\right| + D} - R$$

If safety factor SF is identified as the difference between V$_y$ and W$_y$, one may represent safety factor SF as:

$$R = \left[\frac{D\left|A\cot\theta - \left(A\cot\theta + \frac{G}{2}\right)\cos 2\theta\right|}{\left|\left(A\cot\theta + \frac{G}{2}\right)\sin 2\theta\right| + D}\right] - \left[\frac{D\left|A\cot\theta - \left(A\cot\theta + \frac{G}{2}\right)\cos 2\theta\right| + RD}{\left|\left(A\cot\theta + \frac{G}{2}\right)\sin 2\theta\right| + D} - R\right]$$

from which one may simply the equation for safety factor SF as:

$$SF = R - \frac{RD}{\left|\left(A\cot\theta + \frac{G}{2}\right)\sin 2\theta\right| + D}$$

It is understood that additional safety factor estimates for other system features can be made in a similar fashion. The equations defined herein may also be modified to account for image capture systems in which the sensor normal is at an oblique angle to the document and/or platen normal and image capture systems that capture only a section or portion of the target, where the section is an area rather than a line.

As alluded to above, image capture systems may not include a platen against which rests a media sheet bearing an image to be captured. Even though such image capture systems will not have the potential to generate secondary reflections from the surfaces of a platen, secondary reflections may nevertheless be created if, for example, the surface of the media sheet or article to be captured was sufficiently specularly reflective. In such a system, the configuration and arrangement of optical components defining optical path 160 as explained herein may be utilized so as to ensure that no secondary reflections generated by reflections from the sheet being captured are captured by image sensor 164. Specifically, the top edge F$_y$ of the primary reflection of mirror 170 and the bottom edge Wy of the image's secondary reflection are calculated as above and are instead projected onto the plane containing the media sheet.

The foregoing description of an embodiment has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. An image capture system, comprising:
   a platen for receiving a media sheet bearing an image to be captured;
   an illumination system for illuminating the media sheet;
   a mirror disposed in optical communication with the platen, for reflecting light from the illumination system reflected from the media sheet; and
   an optical sensor for receiving the light reflected by the mirror;
   wherein a location of a top edge of the mirror's primary reflection projected onto the platen is positioned approximately lower than a location of a bottom edge of the image's secondary reflection projected onto the platen, the secondary reflection being an optical ghost image having a lower intensity than the primary reflection.

2. An image capture system, comprising:
   a platen for receiving a media sheet bearing an image to be captured;
   an illumination system for illuminating the media sheet;
   a mirror disposed in optical communication with the platen, for reflecting light from the illumination system reflected from the media sheet; and
   an optical sensor for receiving the light reflected by the mirror;
   wherein a location of a top edge of the mirror's primary reflection projected onto the platen is positioned approximately lower than a location of a bottom edge of the image's secondary reflection projected onto the platen;
   wherein the location of the top edge $F_y$ of the mirror's primary reflection is approximately represented by:

$$F_y = \frac{D \left| \cot\theta \left( \frac{\frac{G}{2} - A\cot\theta}{\cot\theta - \frac{G}{2D}} + A \right) \right|}{\left| -\left( \frac{\frac{G}{2} - A\cot\theta}{\cot\theta - \frac{G}{2D}} \right) \right| + D}$$

and the location of the bottom edge $W_y$ of the image's secondary reflection projected onto the platen is approximately represented by:

$$W_y = \frac{D \left| A\cot\theta - \left( A\cot\theta + \frac{G}{2} \right)\cos 2\theta \right|}{\left| \left( A\cot\theta + \frac{G}{2} \right)\sin 2\theta \right| + D}$$

where D is a distance between a focal point of the optical sensor and the platen, G is a width of an image target area to be captured, A is a distance between the platen and the mirror along a normal of the optical sensor, and θ is an angle between the platen and the mirror.

3. The image capture system of claim 2, wherein the top edge of the mirror's primary reflection projected onto the platen is positioned lower than the bottom edge of the image's secondary reflection projected onto the platen by at least a predetermined amount.

4. The image capture system of claim 3, wherein the predetermined amount is at least about 10 mm.

5. The image capture system of claim 3, wherein the optical sensor includes or is associated with an aperture for receiving the light, and the predetermined amount is based at least in part upon a dimension of the aperture.

6. The image capture system of claim 5, wherein the predetermined amount SF is approximately represented by:

$$SF = R - \frac{RD}{\left| \left( A\cot\theta + \frac{G}{2} \right)\sin 2\theta \right| + D}$$

where R is a radius or half a width of the aperture.

7. The image capture system of claim 1, wherein the platen includes an inner surface and an outer surface, the inner surface being positioned closer to the mirror than the outer surface, and the top edge of the mirror's primary reflection projected onto the platen is projected onto the inner surface of the platen, and the bottom edge of the image's secondary reflection is projected onto the inner surface of the platen.

8. An image capture system for capturing an image of a sheet of media, comprising:
   an illumination system for illuminating the media sheet;
   a mirror disposed in optical communication with the media sheet, for reflecting light from the illumination system that is reflected from the media sheet; and
   an assembly having an optical sensor for receiving the light reflected by the mirror;
   wherein a magnitude of an edge of the mirror's primary reflection projected onto a plane containing the media sheet is less than a magnitude of an edge of the image's secondary reflection projected onto the plane, the secondary reflection being an optical ghost image having a lower intensity than the primary reflection.

9. The image capture system of claim 8, wherein the magnitude of the edge $F_y$ of the mirror's primary reflection is approximately represented by:

$$Fy = \frac{D \left| \cot\theta \left( \frac{\frac{G}{2} - A\cot\theta}{\cot\theta - \frac{G}{2D}} + A \right) \right|}{\left| -\left( \frac{\frac{G}{2} - A\cot\theta}{\cot\theta - \frac{G}{2D}} \right) \right| + D}$$

where D is a distance between a focal point of the optical sensor and the plane containing the media sheet, G is a width of a target area to be captured, A is a distance between the plane and the mirror along a normal of the optical sensor, and θ is an angle between the plane and the mirror.

10. The image capture system of claim 9, wherein the magnitude of the edge $W_y$ of the image's secondary reflection projected onto the plane is approximately represented by:

$$W_y = \frac{D \left| A\cot\theta - \left( A\cot\theta + \frac{G}{2} \right)\cos 2\theta \right|}{\left| \left( A\cot\theta + \frac{G}{2} \right)\sin 2\theta \right| + D}.$$

11. The image capture system of claim 8, wherein the magnitude of the edge of the mirror's primary reflection projected onto the plane is less than the magnitude of the edge of the image's secondary reflection projected onto the plane by at least a predetermined amount.

12. The image capture system of claim 11, wherein the predetermined amount is at least about 10 mm.

13. The image capture system of claim 11, wherein the optical sensor includes an aperture for receiving the light, and the predetermined amount is based at least in part upon a dimension of the aperture.

14. The image capture system of claim 13, wherein the predetermined amount SF is approximately represented by:

$$SF = R - \frac{RD}{\left|\left(A\cot\theta + \frac{G}{2}\right)\sin2\theta\right| + D}$$

where R is a radius or half a width of the aperture of the optical sensor.

15. The image capture system of claim 1, wherein the top edge of the mirror's primary reflection projected onto the platen is positioned lower than the bottom edge of the image's secondary reflection projected onto the platen by at least a predetermined amount.

16. The image capture system of claim 15, wherein the predetermined amount is at least about 10 mm.

17. The image capture system of claim 15, wherein the optical sensor includes or is associated with an aperture for receiving the light, and the predetermined amount is based at least in part upon a dimension of the aperture.

18. The image capture system of claim 1, wherein the image's secondary reflection projected onto the platen comprises at least two additional reflections between the mirror and the platen than the mirror's primary reflection projected onto the platen.

19. The image capture system of claim 1, wherein an optical path of the mirror's primary reflection projected onto the platen is distinct from an optical path of the image's secondary reflection projected onto the platen.

20. The image capture system of claim 19, wherein the optical path of the image's secondary reflection projected onto the platen is a path of light projected from the platen to the mirror, reflected by the mirror to the platen, reflected by the platen to the mirror, and then reflected by the mirror to the optical sensor.

21. The image capture system of claim 8, wherein the image's secondary reflection projected onto the platen comprises at least two additional reflections between the mirror and the platen than the mirror's primary reflection projected onto the platen.

22. The image capture system of claim 8, wherein an optical path of the mirror's primary reflection projected onto the platen is distinct from an optical path of the image's secondary reflection projected onto the platen.

23. The image capture system of claim 22, wherein the optical path of the image's secondary reflection projected onto the platen is a path of light projected from the platen to the mirror, reflected by the mirror to the platen, reflected by the platen to the mirror, and then reflected by the mirror to the optical sensor.

* * * * *